US012218922B2

(12) United States Patent
Bartolucci et al.

(10) Patent No.: US 12,218,922 B2
(45) Date of Patent: Feb. 4, 2025

(54) METHODS AND DEVICES FOR INCREASING ENTROPY OF A BLOCKCHAIN USING BLINDED OUTCOME DIVERSIFICATION

(71) Applicant: nChain Licensing AG, Zug (CH)

(72) Inventors: Silvia Bartolucci, London (GB); Pauline Bernat, London (GB); Daniel Joseph, London (GB); Craig Steven Wright, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/367,404

(22) Filed: Sep. 12, 2023

(65) Prior Publication Data

US 2024/0121229 A1    Apr. 11, 2024

Related U.S. Application Data

(63) Continuation of application No. 17/570,297, filed on Jan. 6, 2022, now Pat. No. 11,792,173, which is a
(Continued)

(30) Foreign Application Priority Data

Sep. 15, 2017    (GB) ...................... 1714907

(51) Int. Cl.
*H04L 9/40*    (2022.01)
*H04L 9/16*    (2006.01)
*H04L 9/00*    (2022.01)

(52) U.S. Cl.
CPC ............ *H04L 63/0464* (2013.01); *H04L 9/16* (2013.01); *H04L 63/0478* (2013.01); *H04L 9/50* (2022.05)

(58) Field of Classification Search
CPC ... H04L 63/0464; H04L 63/0478; H04L 9/15; H04L 9/50
(Continued)

(56) References Cited

U.S. PATENT DOCUMENTS

| 2017/0085562 A1* | 3/2017 | Schultz | G06V 40/1371 |
| 2018/0076955 A1* | 3/2018 | Shields | H04L 63/06 |
| 2020/0127835 A1* | 4/2020 | Fletcher | H04L 9/085 |

FOREIGN PATENT DOCUMENTS

WO    2015179020 A2    11/2015

OTHER PUBLICATIONS

Anonymous, "Bips/bip-dandelion.mediawiki," GitHub, retrieved from https://github.com/dandelion-org/bips/blob/eaaccf89f3674d64a5ca6f2d433660a7667bee80/bip-dandelion.mediawiki, May 9, 2018, 9 pages.
(Continued)

*Primary Examiner* — Michael S McNally
(74) *Attorney, Agent, or Firm* — Tarolli, Sundheim, Covell & Tummino LLP

(57) ABSTRACT

An implementation of the present application provides a computer-implemented method to increase the security of a blockchain-implemented transaction, the transaction including participation from a plurality of participating nodes, each participating node participating as a message originator, selector, and propagator. The method, implemented at a participating node, includes: receiving ciphertext from a prior node and determining whether the participating node is a selector node for said ciphertext received from the prior node. When the participating node is the selector node for said ciphertext, the method includes selecting a subset of said ciphertext, decrypting the selected subset of said ciphertext to provide opted ciphertext and transmitting said opted ciphertext to the next node. When the participating node is other than the selector node for said ciphertext, the method
(Continued)

includes decrypting said ciphertext received from the prior node and transmitting the decrypted ciphertext to the next node.

8 Claims, 12 Drawing Sheets

Related U.S. Application Data continuation of application No. 16/647,111, filed as application No. PCT/IB2018/056906 on Sep. 11, 2018, now Pat. No. 11,223,608.

(58) Field of Classification Search
USPC .......................................................... 713/153
See application file for complete search history.

(56) References Cited

OTHER PUBLICATIONS

Anonymous, "Lightning Network," Bitcoin Wiki, Jul. 3, 2017, https://web.archive.org/web/20170729010627/https://en.bitcoin.it/wiki/Lightning_Network, 4 pages.

Antonopoulos, "Mastering Bitcoin—Unlocking Digital Cryptocurrencies," O'Reilly Media, Inc., Dec. 20, 2014, 282 pages.

Bojja et al., "Dandelion: Redesigning the Bitcoin Network for Anonymity," Jan. 16, 2017, 19 pages.

International Search Report and Written Opinion mailed Nov. 12, 2018, Patent Application No. PCT/IB2018/056906, 12 pages.

Miller et al., "bips/bip-dandelion.mediawiki," GitHub, Jun. 10, 2017, https://github.com/gfanti/bips/blob/master/bip-dandelion.mediawiki, 8 pages.

Nakamoto, "Bitcoin: A Peer-to-Peer Electronic Cash System," Bitcoin, Oct. 31, 2008, https://bitcoin.org/bitcoin.pdf, 9 pages.

Satoshi et al., "Connection Limits," Bitcoin Forum, Aug. 9, 2010, https://bitcointalk.org/index.php?topic=741.0;prev_next=prev, 2 pages.

Shentu et al., "Transaction Remote Release (TRR): A New Anonymization Technology for Bitcoin," arXiv preprint arXiv:1509.06160, Sep. 21, 2015. 18 pages.

Sun et al., "RingCT 2.0: A Compact Accumulator-Based (Linkable Ring Signature) Protocol for Blockchain Cryptocurrency Monero," European Symposium on Research in Computer Security, Sep. 11, 2017, https://eprint.iacr.org/2017/921.pdf, 21 pages.

UK Commercial Search Report mailed Jan. 26, 2017, Patent Application No. GB1714907.1, 5 pages.

UK IPO Search Report mailed Feb. 13, 2018, Patent Application No. GB1714907.1, 8 pages.

Venkatakrishnan et al., "Dandelion: Redesigning the Bitcoin Network for Anonymity," Proceedings of the ACM on Measurement and Analysis of Computing Systems 1(1):1-34, Jun. 13, 2017.

Ziegeldorf et al., "CoinParty: Secure Multi-Party Mixing of Bitcoins," Proceedings of the 5th ACM Conference on Data and Application Security and Privacy, Mar. 2, 2015, 12 pages.

* cited by examiner

METHODS AND DEVICES FOR INCREASING ENTROPY OF A BLOCKCHAIN USING BLINDED OUTCOME DIVERSIFICATION

CROSS REFERENCE TO RELATED APPLICATIONS

This application is a continuation of U.S. patent application Ser. No. 17/570,297, filed Jan. 6, 2022, entitled "METHODS AND DEVICES FOR INCREASING ENTROPY OF A BLOCKCHAIN USING BLINDED OUTCOME DIVERSIFICATION," which is a continuation application of U.S. patent application Ser. No. 16/647,111, filed Mar. 13, 2020, now U.S. Pat. No. 11,223,608, which is a 371 National Stage of International Patent Application No. PCT/M2018/056906, filed Sep. 11, 2018, which claims priority to United Kingdom Patent Application No. 1714907.1, filed Sep. 15, 2017, the disclosures of which are incorporated herein by reference in their entirety.

FIELD OF INVENTION

This invention relates generally to blockchain transactions and more particularly to methods and devices for increasing the security of blockchain-implemented transactions.

BACKGROUND OF INVENTION

In this document, we use the term 'blockchain' to include all forms of electronic, computer-based, distributed ledgers. These include, but are not limited to, consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may refer to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction (Tx) is a data structure that encodes the transfer of control of a digital asset or value between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Network nodes that receive a new transaction may quickly try to push that transaction out to other nodes in the network. Before transmitting a new transaction to other nodes, it may be "validated", meaning it may be checked against a set of criteria to ensure the transaction meets the basic requirements for a proper transaction according to the applicable blockchain protocol.

In order for a transaction to be written to the blockchain, it is incorporated into a block by a mining node (a "miner") that is designed to collect transactions and form them into blocks. The miner then attempts to complete a "proof of work" with respect to the block (specifically, the block header). Miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol.

SUMMARY OF INVENTION

As described, blockchain transactions may have one or more inputs and one or more outputs. Scripts embedded into the inputs and outputs specify how and by whom the outputs of the transactions can be accessed. The output of a transaction may be an address to which token value may be transferred as a result of the transaction. That token value may then be associated with that output address as an unspent transaction output. A subsequent transaction may then reference that address as an input in order to spend or disperse that value.

One of the perceived advantages of blockchain transactions is the ability to transfer token value by associating that token value with one or more addresses. However, these addresses are publicly published on the blockchain ledger, such that there may be risk that information about unspent transaction outputs may be monitored by nodes that may or may not be participating in blockchain transactions.

Development of coin mixing services for blockchain ledgers, for example, focus on preventing monitoring nodes from identifying links between input and output addresses. However, while such coin mixing operations may make it more difficult to identify or trace token movement between addresses, a monitoring node may still be able to perform data mining and machine-learning operations on the publicly available data to determine associations between inputs and outputs for the blockchain transaction and, accordingly, trace the association between token values and addresses. The fact that some coin mixing operations involve a third party creates additional security vulnerabilities in that the third party coordinator may be compromised, which may result in exposing more data than would otherwise be publicly available from the blockchain.

Even if a third party coordinator is not necessarily compromised, the publicly available information on the blockchain may provide a monitoring node with sufficient data to detect patterns attributable to a specific source associated with a set of addresses, so as to enable the monitoring node to determine that a particular set of addresses involved in mixing transactions are associated with a common owner. This latent pattern information in the public blockchain data might be identifiable through big data analysis using machine learning algorithms or the like. This represents a security and privacy vulnerability of the existing blockchain technology, even in the case where coin or value mixing operations are used to increase security and privacy.

Entropy of a system may refer to disorder or uncertainty in a system, and may be associated with the probability that a monitoring node, after observing several blockchain transactions, may deduce information about transaction addresses. The maximum entropy of a system may be provided by a binary logarithm according to the number of participants N:

$$H_M = \log_2 N$$

The entropy of a system after observation by the monitoring node may be expressed as:

$$H(X) = -\sum_{i=1}^{N} p_i \log_2(p_i)$$

where $p_i$ is the probability that a user $i \in \{1, 2, \ldots, N\}$ may be the originator of a message. In an optimal scenario (maximum entropy—minimum information may be known about the system), the probability of associating a message to a specific node in the system with N nodes may be 1/N.

Because blockchain transactions can be submitted to a public ledger, the monitoring node may, by means of transaction traffic analysis or timing analysis, attribute different probabilities to particular nodes in the system. The degree of anonymity, d, may be associated with the information learned by the monitoring node and may be measured as the normalised change in entropy:

$$d = 1 - \frac{H_M - H(X)}{H_M}$$

$$d = \frac{H(X)}{H_M}$$

The maximum degree of anonymity (d=1) may be achieved when the monitoring node may observe each node or subset of nodes in a system as equally likely of being an originator of the message.

It would be advantageous to provide for methods and devices that provide for increased entropy of the system so as to provide increased security and privacy, and to decrease the probability of exposing patterns latent in the data of multiple transactions.

Such improved methods and devices for distributing token values via blockchain-implemented transactions has now been devised.

The methods described herein relate to operations of Blinded Outcome Diversification (BOD) methods for ameliorating some of the challenges and disadvantages described herein. In some implementations, the operations of the BOD methods may increase security by decreasing the probability that a monitoring node may determine a link between an input address and an output address in a value mixing transaction. The methods may increase the entropy of the system so as to reduce the ability of monitoring nodes to determine associations between address and identify patterns within the data of multiple transactions. The methods may be implemented at a participating node for participating in a blockchain transaction. Each participating node in a plurality of participating nodes may generate or originate ciphertext based on common transaction options and transaction values. A dealer node may randomly designate a selector node from the plurality of participating nodes, and the selector node may select one of the transaction options for inclusion in a blockchain transaction. Because selector node, for a particular transaction for inclusion in the blockchain transaction, may be randomly selected from the participating nodes for selecting a transaction option and because the number of output addresses for inclusion in the blockchain transaction may exceed the number of input addresses, the entropy of the system is increased and the ability of monitoring nodes to successfully identify associations between addresses is decreased.

Thus, in accordance with the present invention there are provided methods and devices as defined in the appended claims.

In one aspect, the present application may describe a computer-implemented method to increase security of a blockchain-implemented transaction, the transaction including participation from a plurality of participating nodes. Each participating node may have its own public key and private key. Each participating node may participate as a message originator, selector, and propagator. The method may include receiving ciphertext from a prior node; determining whether the participating node is a selector node for said ciphertext received from the prior node; when the participating node is the selector node for said ciphertext: selecting a subset of said ciphertext; decrypting, using the private key of the participating node, the selected subset of said ciphertext to provide opted ciphertext for propagating to a next node; and transmitting said opted ciphertext to the next node; and when the participating node is other than the selector node for said ciphertext: decrypting using the private key of the participating node, said ciphertext received from the prior node; and transmitting the decrypted ciphertext to the next node.

In some implementations, when the participating node is the selector node, said ciphertext may include two or more encrypted messages, and selecting the subset of said ciphertext may include selecting one of the two or more encrypted messages.

In some implementations, the present application may provide operations of originating ciphertext, which may include: generating at least two messages including a first message with one output address to which the transaction is to allocate a first value and a second message with two output addresses to which the transaction is to allocate a second value and a third value to a respective output address, where the sum of the second value and the third value is the first value; encrypting each of the at least two messages to provide ciphertext, each of the at least two messages being a transaction option; and transmitting the ciphertext to the next node.

In some implementations, the present application may provide that encrypting each of the at least two messages to provide ciphertext includes: receiving a transaction public key and an ordered list of public keys from a dealer node, the ordered list of public keys includes a public key associated with each participating node in the plurality of nodes, the ordered list of public keys in descending order such that the public key associated with the next node is the last public key in the ordered list of public keys; and encrypting each of the at least two messages with the transaction public key and, subsequently, with the ordered list of public keys such that each encrypted message is a nested encryption of that message.

In some implementations, the present application may provide that each of the plurality of participating nodes may generate transaction options having at least one designated format, and at least one designated transaction value.

In some implementations, the present application may provide operations of receiving an indication from a dealer node that the participating node is the propagator node for ciphertext originating from another node in the plurality of participating nodes; generating a transaction public key and a transaction private key; and transmitting the transaction public key to the dealer node for transmission to that another node for originating ciphertext.

In some implementation, when the participating node is the propagator node for said ciphertext, subsequent to decrypting said ciphertext using the private key of the participating node, the present application may describe subsequent operations of decrypting, using the transaction private key, the decrypted said ciphertext to provide an unencrypted selected message corresponding to the opted ciphertext provided by the selector node associated with the opted ciphertext; when said unencrypted selected message includes a first output address, encrypting the first output address and an associated first transaction value with the public key of the participating node to provide a propagator output; when said unencrypted selected message includes a second output address and a third output address, encrypting each of the second output address and the third output address with an associated second transaction value and an associated third transaction value, respectively, with the public key of the participating node to provide the propagator output; and forwarding the propagator output to the subsequent node for mixing of propagator outputs from each of the plurality of participating nodes.

In some implementations, the present application may provide operations of receiving an indication from a dealer node that the participating node is the selector node for ciphertext originating from another participating node, where the participating node is randomly designated by the dealer node as the selector node.

In some implementations, the present application may provide a dealer node designating one of the plurality of participating nodes as a propagator node and one of the plurality of participating nodes as a selector node to be associated with said ciphertext, and the propagator node, the selector node, and a participating node for originating said ciphertext are different participating nodes in the plurality of participating nodes.

In some implementation, the present application may describe a dealer node designating each of the plurality of participating nodes as a propagator node for one other participating node in the plurality of participating nodes.

In some implementation, the present application may provide that the plurality of participating nodes includes at least 4 participating nodes.

In some implementations, the present application may provide that the participating node may participate concurrently as a message originator, selector, and propagator for respectively associated ciphertext such that each participating node in the plurality of participating nodes provides propagator output for associated ciphertext to which that participating node is designated as the propagator node.

Features described above in relation to one aspect or implementations may be used in combination with any other aspect or implementation. For each implementation of the method there is provided a corresponding computing device arranged to implement that method.

Features described in relation to an implementation of the method may also be applicable to the corresponding computing device, and vice versa.

In an additional or alternative aspect, the present application may provide a non-transitory processor-readable medium storing processor-executable instructions to increase security of a blockchain-implemented transaction, wherein the processor-executable instructions, when executed by a processor, cause the processor to carry out any one or more of the methods described herein.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompanying drawings, in which.

DETAILED DESCRIPTION

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
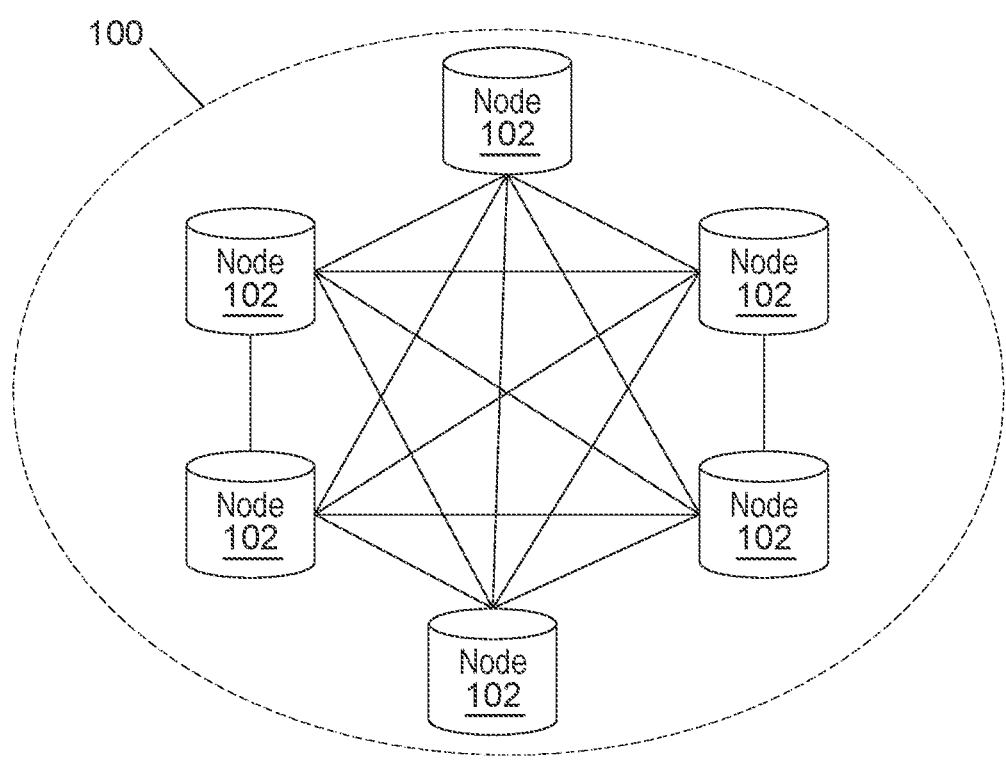
FIG. 1 illustrates in block diagram from an example blockchain network associated with a blockchain.

Reference is now made to FIG. 1, which illustrates in block diagram form an example blockchain network 100 associated with a blockchain. The blockchain network 100 is a peer-to-peer open membership network which may be joined by anyone, without invitation or without consent from other members. Distributed electronic devices executing an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency protocols, for example.

The nodes 102 that may execute the blockchain protocol and the nodes 102 of the blockchain network 100 may be of various types including, for example, computers, such as desktop computers, laptop computers, tablet computers, servers, mobile devices such as smartphones, wearable computers such as smart watches, or other electronic devices.

Nodes 102 of the blockchain network 100 may be coupled to one another using suitable communication technologies which may include wired or wireless communication technologies. In some cases, the blockchain network 100 is implemented at least partly over the Internet, and some of the individual nodes 102 may be located in geographically dispersed locations.

Nodes 102 may maintain a general ledger of all transactions on the blockchain. The global ledger may be a distributed ledger and each node 102 may store a complete copy or a partial copy of the global ledger. Transactions affecting the global ledger may be verified by other nodes 102 so that the validity of the global ledger is maintained. The details of implementing and operating a blockchain network, such as one using the Bitcoin protocol, will be appreciated by those of ordinary skilled in the art.

Each transaction may have one or more inputs and one or more outputs. Scripts embedded into the inputs and outputs specify how and by whom the outputs of the transactions can be accessed.

The output of a transaction may be an address to which value is transferred as a result of the transaction. That value may then be associated with that output address as an unspent transaction output. A subsequent transaction may then reference that address as an input in order to spend or disperse that value.

While transactions may be pseudo-anonymous, in that no personal information is contained in the transactions on the blockchain ledger, in theory, it may be possible for the monitoring device to track or associate transfer of value in a chain of transactions and, in some cases, to associate transferred value to a particular entity using external data. External data may include information extracted from Internet blog sites, social media, or other third party systems, for example, about particular users associated with participating nodes. Development of coin mixing services for blockchain ledgers focus on preventing monitoring devices from trivially associating transaction input and output addresses for associating transfer of digital assets from one entity to another entity. For example, coin mixing systems may include a group of devices that pool assets (e.g., Bitcoins) together and, subsequently, distribute the pooled assets to alternate device addresses. These coin mixing systems may increase the difficulty for a monitoring device to associate transaction input and output addresses.

As described, some coin mixing systems may utilize shuffling operations for disassociating input addresses from output addresses for a blockchain transaction. However, common shuffling operations may utilize pseudorandom processes to shuffle the order of addresses, and pseudorandom processes may inherently be derived from definite mathematical operations. Accordingly, monitoring devices may attempt "brute-force" type attacks for deducing information about one or more participating nodes to a blockchain transaction.

In the description herein, the expressions "participating node" and its "output address" may be used. The reference to an "output address" of the participating node is not meant to refer to a network address of a physical node. Instead, the "output address" is an address specified in a transaction on the blockchain having an unspent value to which the physical node can claim ownership by having a key that corresponds to a signature on the transaction. In this sense, the "output address" is not an address of the participating node, but is a blockchain transaction output address that is associated with the participating node. Any references to the "output address" of a participating node herein should be understood as such.

The present application may describe methods executed by a plurality of participants. For example, the plurality of participating nodes may include at least 4 participating nodes. Many more participating nodes may participate in blockchain transactions as described herein.

Each participating node may be a computing device participating in the blockchain transaction. The computing device may participate as a message originator for generating messages and, subsequently, encrypting the messages. The computing device may also participate as a selector for selecting a subset of ciphertext, where the subset may have been generated by another participating node in the plurality of participating nodes. The computing device may also participate as a propagator for ciphertext that may have originated from yet another participating node in the plurality of participating nodes.

The present application describes a dealer node for distributing public keys and private keys. In some example implementations, the dealer node may be a node other than a participating node, and the dealer node may transfer public keys from one participating node to another participating node. Further, the dealer node may designate particular roles to participating nodes. For example, each participating node may be a message originator. Further, the dealer node may designate each participating node as a selector for ciphertext originating from another participating node and as a propagator for ciphertext originating from yet another participating node. Operations for each of the originator, selector and propagator roles will be described herein.

Figure 2:
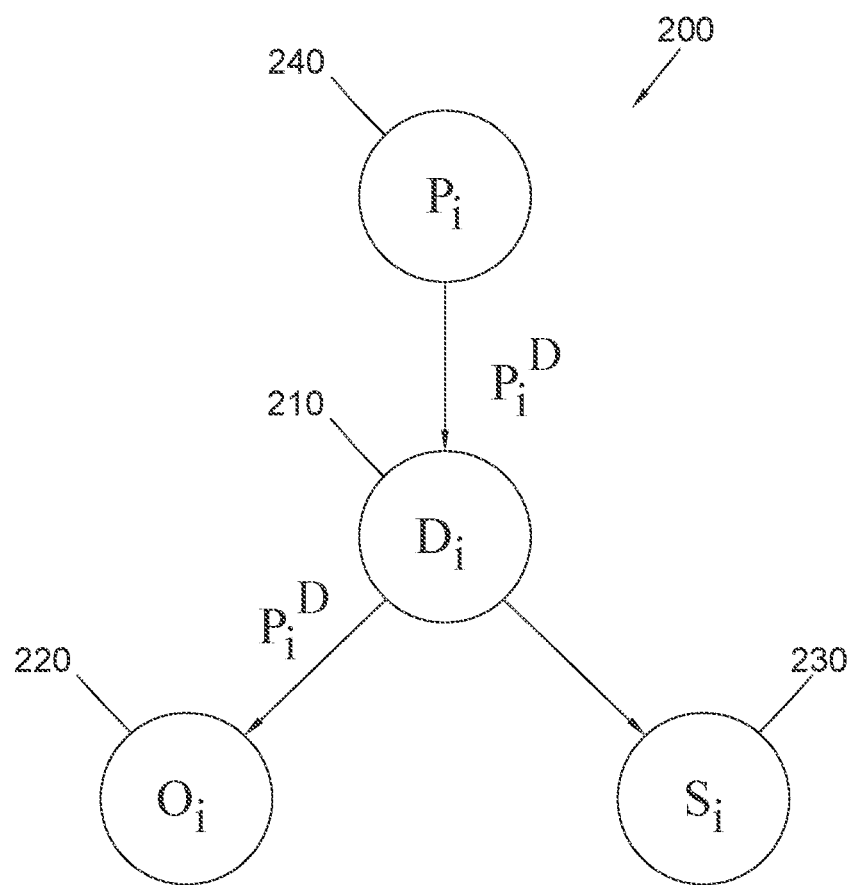
FIG. 2 illustrates nodes from an example cycle $C_i$ performing the methods described herein.

Reference is now made to FIG. 2, which diagrammatically illustrates a subset of the participating nodes for an example cycle $C_i$, in accordance with the present application. A cycle $C_i$ may generally be defined by operations carried out by a plurality of participating nodes for a blockchain transaction. A dealer node 210 may randomly designate a particular participating node as a selector node and a particular participating node as a propagator node.

The dealer node 210 may also define the order or position of each participating node among the plurality of participating nodes for the cycle $C_i$. Each participating node may be associated with a public key and a private key, and the public key of each participating node may be shared with each of the other participating nodes. In some example implementations, the dealer node 210 may: (1) designate the order or position of each participating node; and (2) send to each participating node an ordered list of public keys based on the order or position of each participating node for the cycle $C_i$. In some examples, the order or position of each participating node among the participating nodes for the cycle $C_i$ may be randomly determined or in any other way.

The dealer node 210 may designate one of the plurality of participating nodes as a propagator node and one of the plurality of participating nodes as a selector node. That is, the dealer node 210 may designate a selector 230 and a propagator 240 for selecting and preparing a message from an originator 220, respectively. In the cycle $C_i$, the originator 220, the selector 230, and the propagator 240 may each be a separate participating node for that cycle $C_i$. For example, the cycle $C_1$ may denote BOD operations carried out by the plurality of participating nodes, where a message may be generated by a node U1, a transaction option may be selected by a node $U_j$, and the opted transaction option may be propagated by a node Un, where n may represent the number of participating nodes and 1<j<n.

A dealer node 210 may designate the propagator 240 for decrypting a message that originates from the originator 220. The decrypted message may be a transaction to be included in the blockchain transaction. In some examples, the blockchain transaction may be a transaction for a coin mixing operation. The propagator 240 may generate a transaction public key/private key $(P_i^P/V_i^P)$ pair for the cycle $C_i$. In some implementations, before the originator 220 generates messages and encrypts the messages, the propagator 240 may transmit the transaction public key $(P_i^P)$ to the dealer node 210, and the dealer node 210 may transmit that transaction public key $(P_i^P)$ to the originator 220. For the cycle $C_i$, the dealer node 210 may send the transaction public key $(P_i^P)$ to the originator 220.

The dealer node 210 may randomly designate the selector 230. The selector 230 may be any one of the plurality of participating nodes. As will be described, the selector 230 may receive ciphertext from a prior participating node, select a subset of the received ciphertext, and decrypt the selected subset of the ciphertext using the private key of the selector 230 to provide opted ciphertext for propagating to a next node in the cycle $C_i$. As will be apparent from the methods described herein, because the selector 230 may be randomly selected by the dealer node 210, and because the selection mechanism from each of the participating nodes may differ, the distribution of token values by the blockchain transaction may be provided in a less deterministic way for ameliorating some of the security disadvantages described herein.

Figure 3:
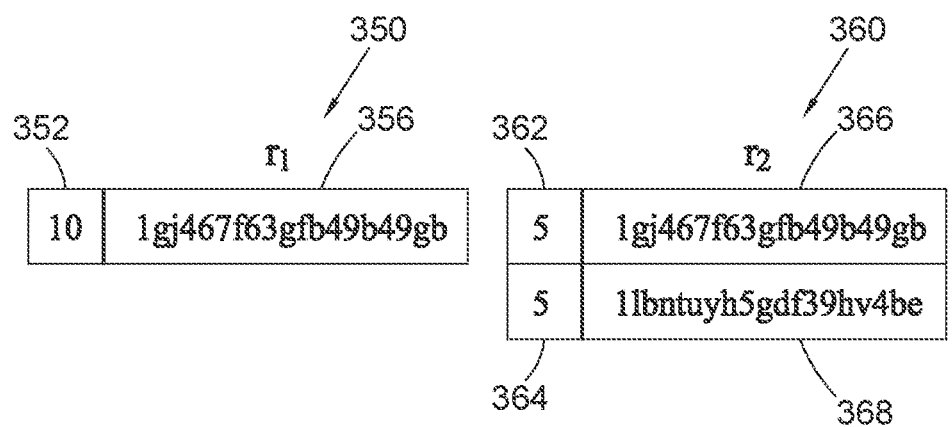
FIG. 3 illustrates example messages that may be generated by a participating node.

Reference is now made to FIG. 3, which diagrammatically illustrates example messages that may be generated by any participating node. When a participating node may be designated as an originator 220 (FIG. 2) for originating ciphertext, the participating node may generate at least two messages including a first message with one output address to which the transaction is to allocate a first value and a second message with two output addresses to which the transaction is to allocate a second value and a third value to a respective output address. The sum of the second value and the third value may equal the first value. Further, the participating node may encrypt each of the at least two messages to provide ciphertext, where each of the at least two messages may be a transaction option. The participating node may then transmit the generated ciphertext to a next node.

To illustrate, the originator 220 may generate a first message ($r_1$) 350 and a second message ($r_2$) 360. The first message 350 may include a first output address 356. The second message 360 may include a second output address 366 and a third output address 368. In this example, the originator 220 generates two transaction options, including: (i) an option to split an input value (e.g., 10 Bitcoin) for a transaction into two identical values (e.g., 5 Bitcoin), where each of the two values may be associated with a respective output address; or (ii) an option to transmit the whole of the input value (e.g., 10 Bitcoin) to a single output address. Selection of one of the two message options may be made by the randomly designated selector 230 (FIG. 2). The selector 230 may select an option without knowledge of who the originator may be. As will be described, because each of the message options will be subject to nested encryption by the transaction public key and public keys of the plurality of participating nodes, the selection of one of two or more message options may be made by the selector 230 without any knowledge of message contents (e.g., token value and output address).

A message option format may be defined for the cycle $C_i$, and each participating node performing operations for originating ciphertext may generate messages in accordance with the prescribed message option format for that cycle $C_i$. That is, in some implementations, each of the plurality of participating nodes may generate transaction options having at least one designated format and at least one designated transaction value. For example, in FIG. 3, the prescribed message option format may include a first message 350 having a first transaction value 352 (e.g., 10 Bitcoin) and a first output address 356. The message option format may also be prescribed to include a second message 360 having a second transaction value 362 (e.g., 5 Bitcoin) and a third transaction value 364 (e.g., 5 Bitcoin), where the second transaction value 362 may be associated with a second output address 366 and where the third transaction value 364 may be associated with a third output address 368. Each of the message options may be a transaction option for the cycle $C_i$.

The originator 220 may encrypt the message options to provide ciphertext. For example, the originator 220 may receive a transaction public key and an ordered list of public keys from the dealer node 210. The ordered list of public keys may include a public key associated with each participating node in the plurality of participating nodes. The ordered list of public keys may be in reverse or descending order such that the public key associated with the next node is the last public key in the ordered list of public keys. Further, the originator 220 may encrypt each of the message options with the transaction key and, subsequently, with the ordered list of public keys such that each encrypted message is a nested encryption of that message.

In the above example, the participating node may generate the second message with two output addresses; however, in some implementations, the second message may include more than two output addresses to which the transaction is to allocate values to the respective output addresses, where the sum of the allocated values may equal the first value. For example, the second message may include three output addresses to which the transaction is to allocate a second value, a third value, and a fourth value to a respective output address, and where the sum of the second value, the third value and the fourth value may equal the first value. That is, in some implementations, the second message may include any number of output addresses for associating with values.

Figure 4:
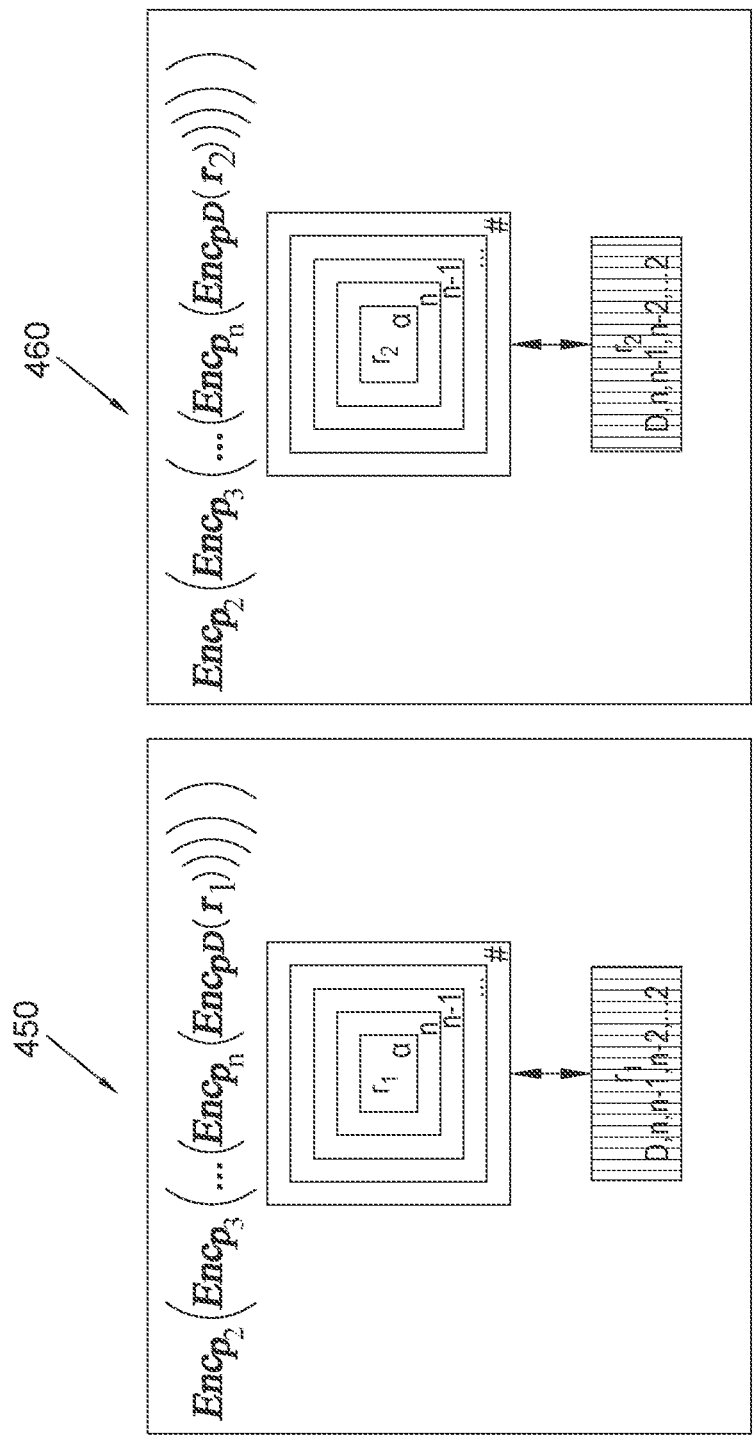
FIG. 4 illustrates a nested encryption of each of two or more messages of FIG. 3.

Reference is now made to FIG. 4, which diagrammatically illustrates a nested encryption of each of the two or more messages generated by the originator 220 (FIG. 2) for the cycle $C_i$. The nested encryption of each of the two or more messages may include encryption operations using the transaction public key and the ordered list of public keys of the participating nodes in descending order for the cycle $C_i$.

In particular, FIG. 4 illustrates a nested encryption 450 of the first message ($r_1$) 350 (FIG. 3). The originator 220 may encrypt the first message ($r_1$) 350 using: (1) the transaction public key (e.g., that was provided by the dealer node 210 and that was generated by the propagator 240 for that cycle $C_i$); and, subsequently, (2) the ordered list of public keys in reverse order.

For example, if the cycle $C_i$ includes 5 participating nodes, the originator 220 may: (1) encrypt the first message ($r_1$) using the transaction public key and, subsequently, (2) successively encrypt using the public key associated with the fifth participating node, the fourth participating node, the third participating node, and the second participating node.

Similarly, FIG. 4 also illustrates a nested encryption 460 of the second message ($r_2$) 360 (FIG. 3). The originator 220 may: (1) encrypt the second message ($r_2$) using the transaction public key and, subsequently, (2) successively encrypt using the public key associated with the fifth participating node, the fourth participating node, the third participating node, and the second participating node. The combination of the nested encryption of the first message ($r_1$) and the second message ($r_2$) may be ciphertext associated with the originator 220 for that cycle $C_i$, and the originator 220 may transmit that ciphertext to the next node in the plurality of participating nodes. Although the example described with reference to FIGS. 3 and 4 include two message options or transaction options (e.g., first message ($r_1$) and second message ($r_2$)), in some example implementations, the originator 220 may generate more than two transaction options for the cycle $C_i$.

The nested encryption of the first message ($r_1$) and the second message ($r_2$) is transmitted successively to participating nodes for the cycle $C_i$, according to the order designated by the dealer node 210. As successive participating nodes decrypt the received ciphertext using its own private key, the nested encryption of first message (r1) and the second message (r2) will successively be unencrypted. When the ciphertext is ultimately transmitted to the propagator 240 (e.g., last node of the participating nodes for the cycle $C_i$), the propagator 240 may decrypt the ciphertext using the private key of the propagator 240 and, subsequently, decrypt the resulting ciphertext using the transaction private key. The transaction private key may correspond to the transaction public key that the propagator 240 previously transmitted to the dealer node 210 for transmitting to the originator 220 of the cycle $C_i$.

Figure 5:
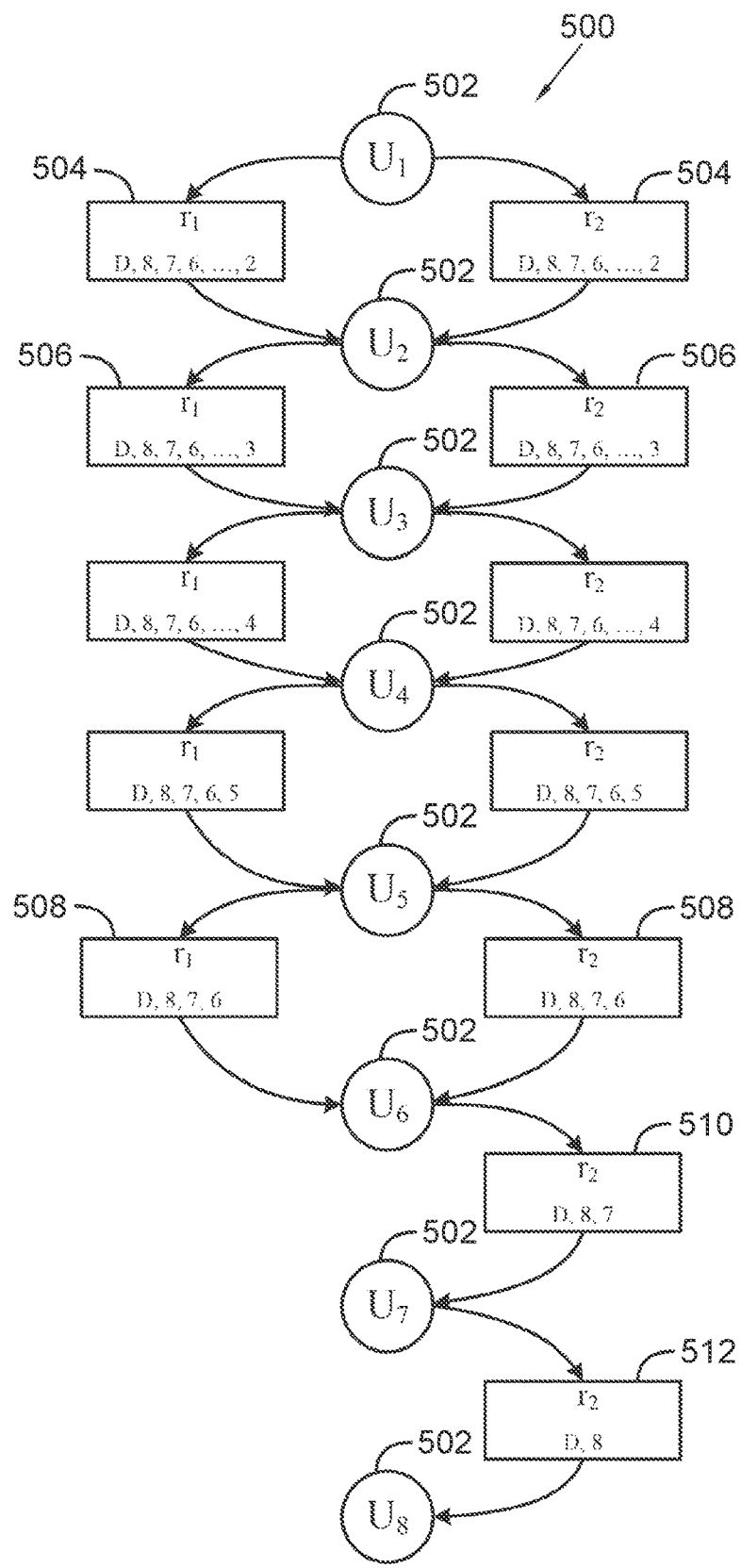
FIG. 5 illustrates an example implementation of nested decryption of ciphertext and selection of a transaction option for a cycle $C_i$, in accordance with the present application.

Reference is now made to FIG. 5, which diagrammatically illustrates nested decryption of ciphertext and selection of a transaction option for a cycle $C_i$, in accordance with the present application. The cycle $C_i$ may generally be defined by operations carried out by the plurality of participating node. The cycle $C_i$ may have 8 participating nodes 502. For ease of exposition, individual participating nodes 502 may be identified as "U1", "U2", "U3", "U4", "U5", "U6", "U7", and "U8". Although the participating nodes for the illustrated cycle in FIG. 5 includes 8 participating nodes, any number of nodes may participate in the blockchain transaction for cycle $C_i$. In some implementations, the number of participating nodes may be any number that is greater than 3 participating nodes. FIG. 5 illustrates a cycle $C_1$, where node U1 may originate messages and generate ciphertext. Further, a dealer node may designate node U6 as a selector node and may designate node U8 as a propagator node.

The dealer node may designate the node order or node positions. In FIG. 5, the dealer node may designate the node order according to an ascending node identifier order, such as from U1 to U8. However, in some examples, the dealer node may designate the node order in any other way, and the node order may not be according to an ascending node identifier order.

Generally, the originator 220 (FIG. 2) may be the first participating node for the cycle $C_i$. The propagator 240 may be the last participating node Un. The selector 230 may be an intermediately positioned participant $U_j$, where n is the number of participating nodes and 1<j<n. The dealer node may designate node U6 as the selector node 230 (FIG. 2). Accordingly, in FIG. 5, the originator 220 may be node U1, the selector 230 may be node U6, and the propagator 240 (FIG. 2) may be node U8. Although node U6 is designated as the selector 230, the selector 230 may be any other node that is not the originator and not the propagator. In FIG. 5, the dealer node could also randomly designate any of node U2, node U3, node U4, node U5, or node U7 as the selector 230.

Prior to carrying out operations of the cycle $C_1$, node U8 may receive an indication from the dealer node 210 that node U8 is the propagator 240 for ciphertext originating from the originator 220. It should be appreciated that in some implementations, the propagator 240 may not know which participating node is the originator 220. Further, the propagator 240 may not need to know which participating node is the originator 220. The propagator 240 may only need to know that it may carry out operations of the propagator for ciphertext that originated from another participating node in the plurality of participating nodes. The node U8 may generate a transaction public key and a transaction private key and transmit the transaction public key to the dealer node 210 for transmission to the originator 220.

The dealer node may also transmit an ordered list of public keys to the originator 220. In the example of FIG. 5, the dealer node 210 may transmit an ordered list of public keys (e.g., public keys associated with nodes U8, U7, U6, U5, U4, U3, and U2). The order of the transmitted public keys may be based on the participating node order designated by the dealer node 210. In the example of FIG. 5, the ordered list of public keys may be a descending ordered list of public keys, namely public keys associated with nodes U8, U7, U6, . . . , U3, and U2. As will be apparent from the description herein, when node U1 generates message options and encrypts the message options using nested encryption operations to provide ciphertext, the ciphertext may be successively transmitted to a next node in the ordered participating nodes, thus successively decrypted using respective private keys associated with each "next node."

In FIG. 5, node U1 may generate at least two messages including a first message and a second message. The first message may be a first message option including a first output address to which the transaction is to allocate a first value. The second message may be a second message option including a second output address to which the transaction is to allocate a second value and a third output address to which the transaction is to allocate a third value. When the two messages are provided for the cycle $C_1$, node U1 may encrypt the first message (r1) and the second message (r2), respectively, using the nested encryption operations briefly described with reference to FIG. 4. The combination of the nested encrypted first message (r1) and the nested encrypted second message (r2) may be ciphertext, and node U1 may transmit the ciphertext to node U2.

Simultaneous reference will now be made to FIG. 6, which illustrates in flowchart form an example method 600 implemented at a participating node for participating in the blockchain transaction, in accordance with the present application. The method 600 may include operations that may be carried out by one or more processors at one of the participating nodes of the blockchain transaction. The present implementation presumes that the participating node carrying out the operations is not the originator node of received ciphertext.

Figure 6:
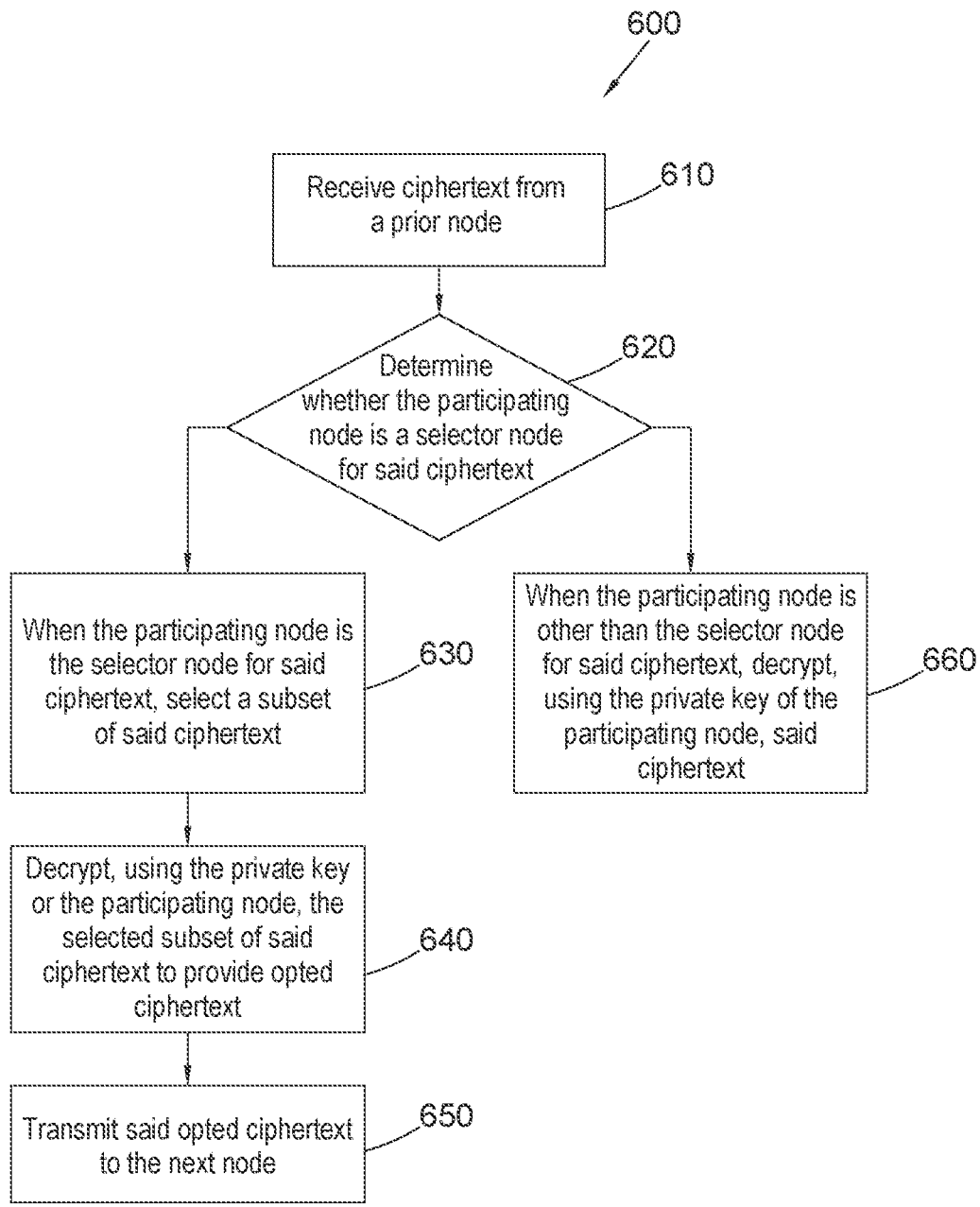
FIG. 6 illustrates in flowchart form an example method implemented at a participating node for participating in a blockchain transaction, in accordance with the present application.

To illustrate, presume that the participating node carrying out operations of method 600 of FIG. 6 is node U2. At operation 610, the processor may receive ciphertext from a prior node. In the present example, the prior node may be node U1, and the ciphertext may include the combination of the nested encrypted first message (r1) and the nested encrypted second message (r2). The combination of the nested encrypted messages may be the ciphertext.

At operation 620, the processor may determine whether the participating node is a selector node for said ciphertext received from the prior node. In FIG. 5, node U6 may be the designated selector node. At operation 620, the processor may determine that node U2 is not a selector node for said ciphertext received from node U1. That is, the participating node is other than the selector node for said ciphertext received from node U1.

When the processor determines that the participating node is other than the selector node for the received ciphertext, at operation 660, the processor may decrypt the received ciphertext using the private key of the participating node (e.g., node U2). Because node U1 (originator) performed operations to generate nested encrypted messages using a series of public keys corresponding to the designated node order, node U2 may decrypt the "current" state of the ciphertext 504 that is received from node U1.

The processor may subsequently transmit the decrypted ciphertext to a next participating node (e.g., node U3). When node U2 decrypts the "current state" of the ciphertext 504 using the private key of node U2, the originally generated first message (r1) and the originally generated second message (r2) is decrypted, and a "subsequent current state" of the ciphertext (illustrated in FIG. 5 with reference numeral 506) will be such that fewer public keys may be needed to provide an unencrypted version of the ciphertext. As illustrated in FIG. 5, once node U2 decrypts the "current" state of the ciphertext 504, the decrypted ciphertext may be a nested encryption requiring the remaining list of public keys to be used for providing the unencrypted version of the ciphertext.

At operation 620, if the processor determines that the participating node is a selector node for said ciphertext, at operation 630, the processor may select a subset of said ciphertext.

To illustrate, presume now that the participating node carrying out operations of method 600 of FIG. 6 is node U6. Because the dealer node may have designated node U6 as the selector, at operation 630, the processor may select one of the nested encrypted first message ($r_1$) and the nested encrypted second message ($r_2$). When the participating node carrying out operations is node U6, the ciphertext received from the prior node is illustrated as ciphertext identified in FIG. 5 with reference numeral 508. This ciphertext includes both the first message (r1) and the second message (r2) encrypted with the transaction public key and private keys associated with each of nodes U8, node U7, and node U6. In FIG. 6, the selector node may select the nested encrypted second message (r2) as the subset of the said ciphertext. In some implementations, selection of the first message (r1) or the second message (r2) may be based on input received at the selector node; however, the selection may be made in any other way.

At operation 640, the processor may decrypt, using the private key associated with node U6, the selected subset of said ciphertext to provide opted ciphertext. For example, the processor may decrypt, using the private key of node U6, the nested encrypted second message (r2) to provide opted ciphertext 510.

At operation 650, the processor may transmit the opted ciphertext 510 to the next participating node. As illustrated in FIG. 5, node U6 propagates the opted ciphertext 510 to node U7. Because the processor did not select the nested encrypted ciphertext corresponding to the first message (r1), the first message (m1) may not be propagated to any subsequent participating nodes for the cycle $C_1$. That is, the nested encrypted ciphertext corresponding to the first message ($r_1$) may not ever be received at the propagator, node U8.

In some example implementations, even if the nested encrypted ciphertext corresponding to the first message (r1) were to be ultimately propagated to node U7, because node U6 does not decrypt, using the private key of node U6, the non-selected ciphertext associated with the first message (r1), subsequent participating nodes may not be able to successfully decrypt the nested encrypted ciphertext according to the nested order of encryption/decryption.

To further illustrate, presume now that the participating node carrying out operations of method 600 of FIG. 6 is node U7. At operation 610, the processor may receive ciphertext from node U6. In the present example, the received ciphertext may be the opted ciphertext 510. The opted ciphertext 510 may be a "current state" of the ciphertext, where the "current state" of the ciphertext may be the second message ($r_2$) encrypted with the transaction public key and public keys associated with the eight participating node and the seventh participating node.

At operation 620, the processor may determine that the participating node, node U7, is other than the selector node for the received ciphertext. In the first cycle, cycle $C_1$, the selector node may be node U6, and node U7 may be positioned subsequent to node U6.

At operation 660, the processor may decrypt, using the private key associated with node U7, the received opted ciphertext 510 to provide decrypted ciphertext for propagating to node U8. In the present example, the decrypted ciphertext may be the second message ($r_2$) encrypted with the transaction public key and the public key associated with node U8. That is, the decrypted ciphertext may be pre-propagator ciphertext 512, as illustrated in FIG. 5. Accordingly, at operation 660, the processor may transmit the pre-propagator ciphertext 512 to the propagator node, node U8.

Figure 7:
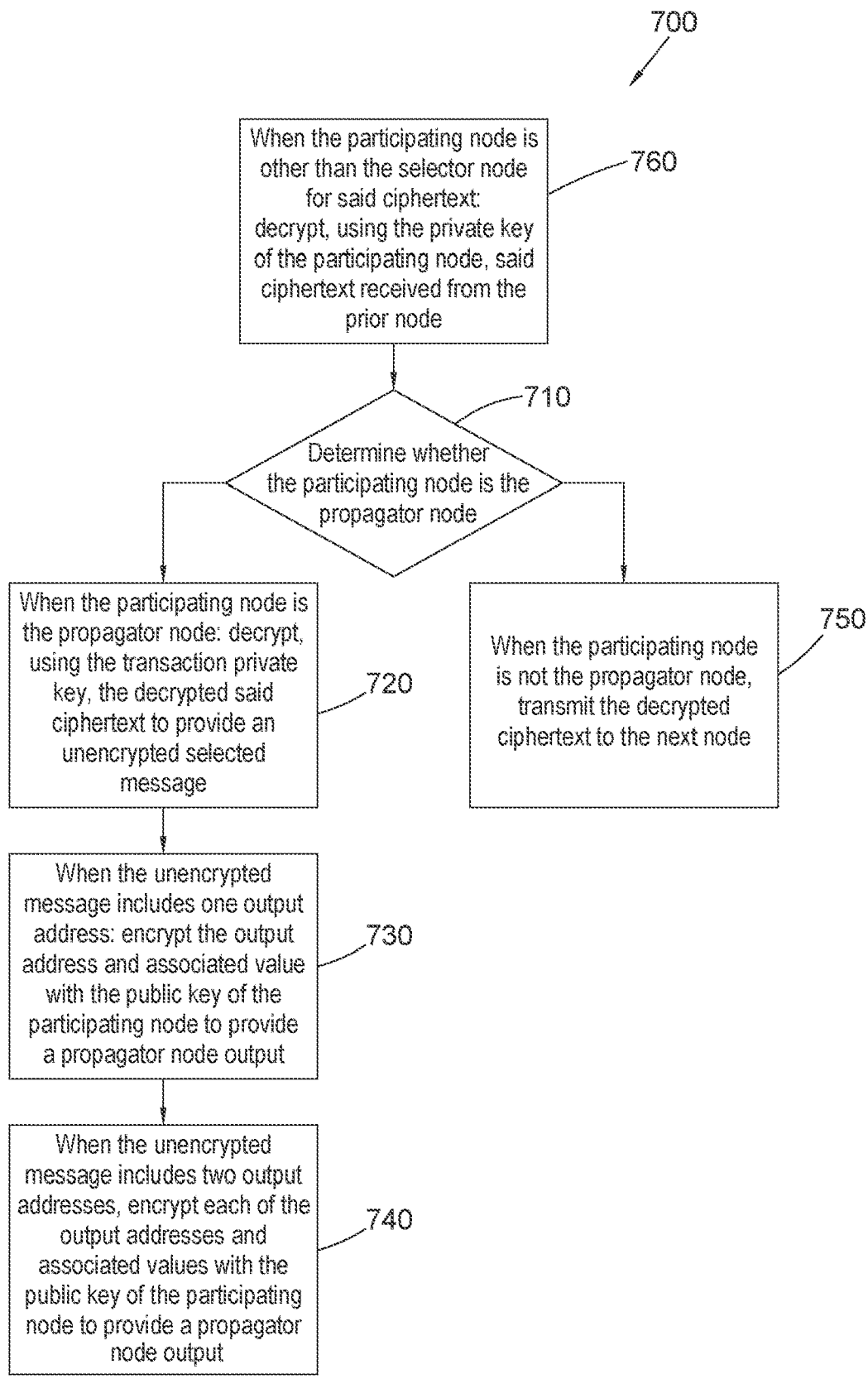
FIG. 7 illustrates in flowchart form an example method implemented at a participating node that may be designated as a propagator, in accordance with the present application.

Reference is now made to FIG. 7, which illustrates in flowchart form an example method 700 implemented at a participating node that may be: (1) other than the selector 230 (FIG. 2); and (2) designated by the dealer as the propagator 240 (FIG. 2), in accordance with the present application. The method 700 may include operations that may be carried out by one or more processors at one of the participating nodes of the blockchain transaction in the cycle $C_i$. The present implementation presumes that the participating node carrying out the operations is not the originator node of received ciphertext for the cycle $C_i$.

At operation 760, the processor may decrypt, using the private key of the participating node, the received ciphertext to provide decrypted ciphertext. Operation 760 illustrated in FIG. 7 may correspond to operation 660 illustrated in FIG. 6.

At operation 710, the processor may determine whether the participating node is a propagator 240 (FIG. 2). If the participating node is not the propagator 240, the processor may, at operation 750, transmit the decrypted ciphertext to the next node. To illustrate, presume that the present participating node is a participating node other than the selector and is a participating node other than the propagator. For example, presume that the participating node is the second participating node, node U2 of FIG. 5. At operation 750, the processor may transmit the decrypted ciphertext 506 to the next node, such as node U3, of the participating nodes for the cycle $C_i$.

At operation 710, if the processor determines that the participating node is the propagator 240 for the cycle $C_i$, at operation 720, the processor may decrypt, using the transaction private key, the decrypted ciphertext to provide an unencrypted selected message corresponding to opted ciphertext provided by the selector node.

To illustrate, presume that the participating node carrying out operations of method 700 of FIG. 7 is node U8. At operation 760, the processor may decrypt, using the private key of node U8, the received ciphertext to provide decrypted ciphertext. Further, at operation 720, when the participating node is the propagator node for the decrypted ciphertext, the processor may decrypt, using the transaction private key, the decrypted ciphertext to provide an unencrypted selected message corresponding to the opted ciphertext provided by the selector node associated with the opted ciphertext. It may be appreciated that because the operations described herein may require the propagator for a given cycle $C_i$ to carry out decryption with: (1) the private key associated with the propagator node; and (2) the transaction private key, it may be more challenging for any of the participating nodes (e.g., operating concurrently as a monitoring node) to deduce a chain of participating nodes among the plurality of participating nodes for the cycle $C_i$ for associating the propagator (and thus the propagator output(s)) with the originator.

In the present example cycle $C_1$ of FIG. 5, the selector, node U6, selected a subset of the ciphertext originating from node U1. The selected subset of the ciphertext included a nested encrypted second message. Recall that the second message (r2) 360 (FIG. 3) may include a second output address 366 (FIG. 3) associated with a second transaction value 362 (e.g., 5 Bitcoin) and a third output address 368 (FIG. 3) associated with a third transaction value 364 (e.g., 5 Bitcoin). Because the unencrypted selected message includes two output addresses, at operation 740, the processor may encrypt each of the unencrypted output addresses and associated value with the public key of the participating node (e.g., node U8) to provide a propagator node output.

If, however, the selected subset of the ciphertext included a nested encrypted first message (not illustrated in FIG. 5), at operation 730, the processor may encrypt the unencrypted output address and associated value with the public key of the participating node (e.g., node U8) to provide a propagator node output.

In the methods described herein, the originator 220 may have knowledge of the ordering of the participating nodes for the cycle $C_i$. However, the originator 220 may not have knowledge of which participating node may be the selector 230. The originator 220 may have knowledge of which participating node is the propagator 240; however, the propagator 240 may not have knowledge of which participating node is the originator 220 because the transaction public key is transmitted to the originator 220 through the dealer node 210. Although the originator 220 may have knowledge of which participating node is the propagator 240 and could request the transaction private key from the propagator 240, doing so would negate the advantages offered by the methods described herein. That is, if the originator 220 attempted to bypass the operations for the cycle $C_i$ described herein, the advantages realized by taking the selection process away from a particular participating node would be negated.

Figure 8:
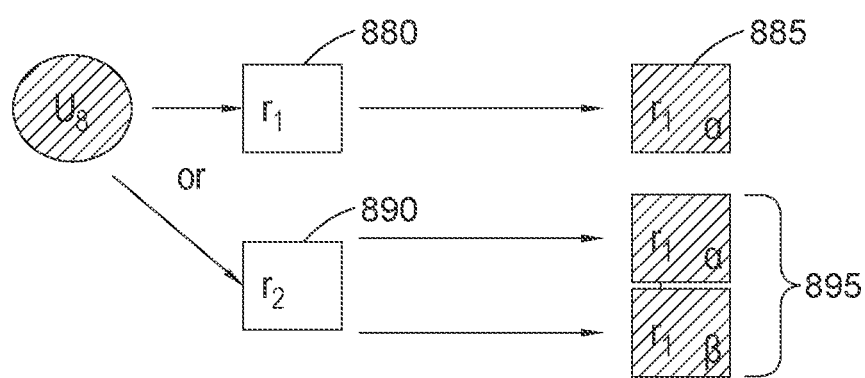
FIG. 8 illustrates example propagator output from a participating node designated as a propagator for a cycle $C_1$, in accordance with the present application.

Reference is now made to FIG. 8, which illustrates possible propagator node output from node U8, in accordance with the present application. To illustrate possible propagator node output from each of operation 730 or operation 740, FIG. 8 which diagrammatically illustrates possible propagator node output from node U8 of the cycle $C_1$ illustrated in FIG. 5.

If the selector (e.g., node 6) selects the subset of ciphertext that included a nested encrypted first message (r1) (not illustrated in FIG. 5), at operation 720 (FIG. 7), the processor may provide the first unencrypted selected message (r1) 880, illustrated in FIG. 8.

If the selector (e.g., node 6) selected the subset of ciphertext that included a nested encrypted second message (r2), at operation 720 (FIG. 7), the processor may provide the second unencrypted selected message (r2) 890, illustrated in FIG. 8.

At operation 730, when the unencrypted selected message includes a first output address, the processor may encrypt the first output address and an associated first transaction value with the public key of node U8 to provide a propagator output. That is, the first unencrypted selected message (r1) 880 may include one output address associated with one transaction value. At operation 730, the propagator output may be first propagator output 885.

At operation 740, when the unencrypted selected message includes a second output address and a third output address, the processor may encrypt the second output address and an associated second transaction value with the public key of node U8 and may encrypt the third output address and an associated third transaction value with the public key of node U8 to provide propagator output. That is, the second unencrypted selected message (r2) 890 may include two output addresses, each associated with a transaction value. At operation 740, the propagator output may be second propagator output 895, which includes two outputs. The respective outputs may represent split transaction values. For example, if the selector (e.g., node 6) selected the subset of ciphertext associated with splitting a transaction output into two outputs (e.g., 10 Bitcoin split into two 5 Bitcoin messages), at operation 740, the propagator would include two outputs.

Accordingly, at the end of the cycle $C_i$, depending on the message option selection made by the selector node, the propagator may create either a one-line propagator output having one output address or two one-line propagator outputs having two output addresses. As described, in the example cycle $C_1$ illustrated in FIG. 5, the propagator (e.g., node U8) provides two one-line propagator outputs, such as the second propagator output 895 illustrated in FIG. 8.

In addition to the first cycle $C_1$ illustrated in FIG. 5, operations associated additional cycles $C_i$ may also be carried out by the participating nodes. For example, cycle Ca may be created, where node U2 may be the originator and where the dealer node may randomly designate a selector and a propagator for cycle Ca. Similarly, cycles $C_3$, $C_4$, . . . . and $C_8$ are created, where node U3, node U4, . . . , and node U8 may be the originator, respectively, and where the dealer node may randomly designate a selector and a propagator for the respective cycles. The dealer node may randomly designate a selector node among the participating nodes for each of the cycles $C_i$. Because the selector node for each of the cycles $C_i$ is randomly designated, the methods described herein may increasingly limit the probability that a monitoring node may deduce decision patterns.

The methods described herein presume that the monitoring node may be interested in associating one or more output addresses to particular entities, such that token transfers may be tracked. However, the only output addresses that may be known to a participating node may be the output addresses for which that node is the propagator. In the methods described herein, the propagator may not have knowledge of the originator for a given cycle $C_i$. To limit the possibility that the monitoring node may deduce which participating nodes may be a selector in a given cycle $C_i$, the dealer node may randomly designate a participating node as a selector, where the random designation in one cycle is independent of any designation of that participating node for another cycle. Accordingly to the methods described herein, it may be possible that a first participating node may be designated to be a selector in several cycles $C_i$, while a second participating node may not be designated as a selector in any cycles $C_i$.

In some implementation, each participating node in the plurality of participating nodes may be designated as a propagator for no more than one cycle. For example, once node U8 may be designated as a propagator for cycle $C_1$ (e.g., node 1 as originator), node U8 may not be a propagator for any of the other cycles (e.g., node U8 may not be a propagator for any of cycles $C_2, C_3, \ldots,$ or $C_8$).

In some implementations, with N participating nodes, there may be N cycles. The N cycles may be carried out in parallel provided that dealer node(s) designate particular participating nodes as selector and propagator for each of the N cycles and provided that public transaction keys and participating node public keys are exchanged (see e.g., FIG. 2) a priori.

Figure 9:
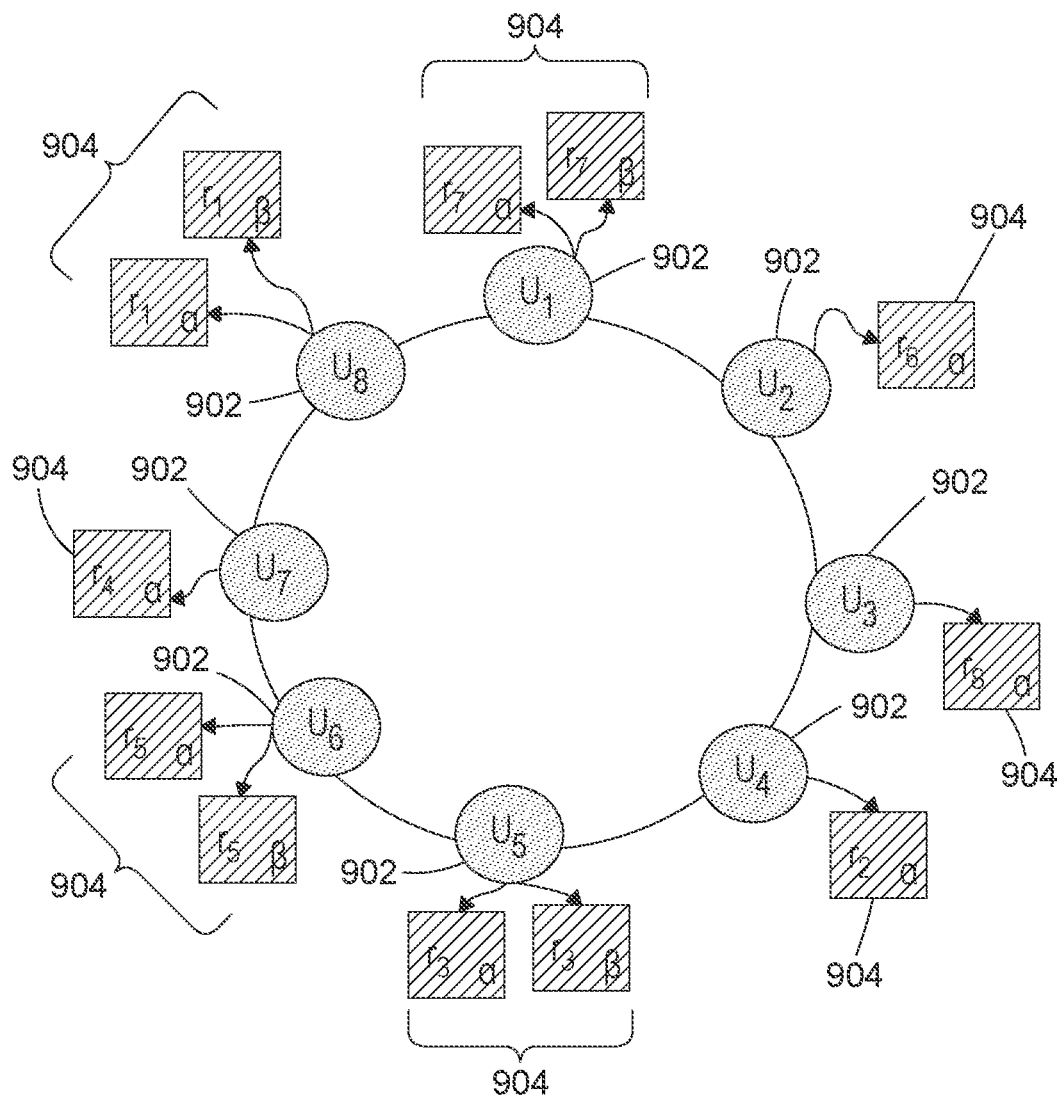
FIG. 9 illustrates participating nodes to a blockchain transaction, where each participating node provides propagator output from a respective cycle $C_i$, in accordance with the present application.

Reference is now made to FIG. 9, which diagrammatically illustrates propagator node output 904 after operations carried out by participating nodes 902 over N cycles may have completed, in accordance with the present application. In the illustrated example of FIG. 9, there may be eight participating nodes participating in a blockchain transaction. Accordingly, there may be eight cycles (e.g., cycle $C_1, C_2, \ldots$ and $C_8$).

In FIG. 9, each of the participating nodes may have been designated a propagator for ciphertext originating from an originator. The originator may be a participating node different than the designated propagator. In FIG. 9, each participating node Ui may be a propagator and may provide either an one-line propagator output or two one-line propagator outputs, based on messages originated by another participating node Uj.

To illustrate, when node U8 is designated as the propagator for messages originating from node U1 (e.g., cycle $C_1$ illustrated in FIG. 5), node U8 may provide two one-line propagator outputs, such as propagator outputs $r_{1\alpha}$ and $r_{1\beta}$.

In another illustration, when node U1 is designated as the propagator for messages originating from node U7, node U1 may provide two one-line propagator outputs, such as propagator outputs $r_{7\alpha}$ and $r_{7\beta}$.

In another illustration, when node U2 is designated as the propagator for messages originating from node U6, node U2 may provide a one-line propagator output, such as propagator output $r_{6\alpha}$, illustrated in FIG. 9.

In the example implementations described herein, at the end of N cycles, each participating node may provide propagator output. The number of provided propagator outputs for the N cycles may be greater than the number participating nodes, as it may be statistically unlikely that selectors for each of the N cycles may choose a transaction option not to split input values (e.g., 10 Bitcoin split into two 5 Bitcoin message outputs in example described herein).

Accordingly, to build a blockchain transaction in which the plurality of participating nodes may be participating, shuffling techniques may be carried out for merging the propagator outputs, such that the propagator node outputs may be assembled in a random order. In scenarios where a selector may choose a transaction option for splitting input values (e.g., 10 Bitcoin split into two 5 Bitcoin message outputs in the example described herein), after the propagator outputs are shuffled and merged, two output addresses associated with split input values (e.g., 5 Bitcoin each) may no longer be adjacent in the shuffled/merged propagator output set.

Figure 10:
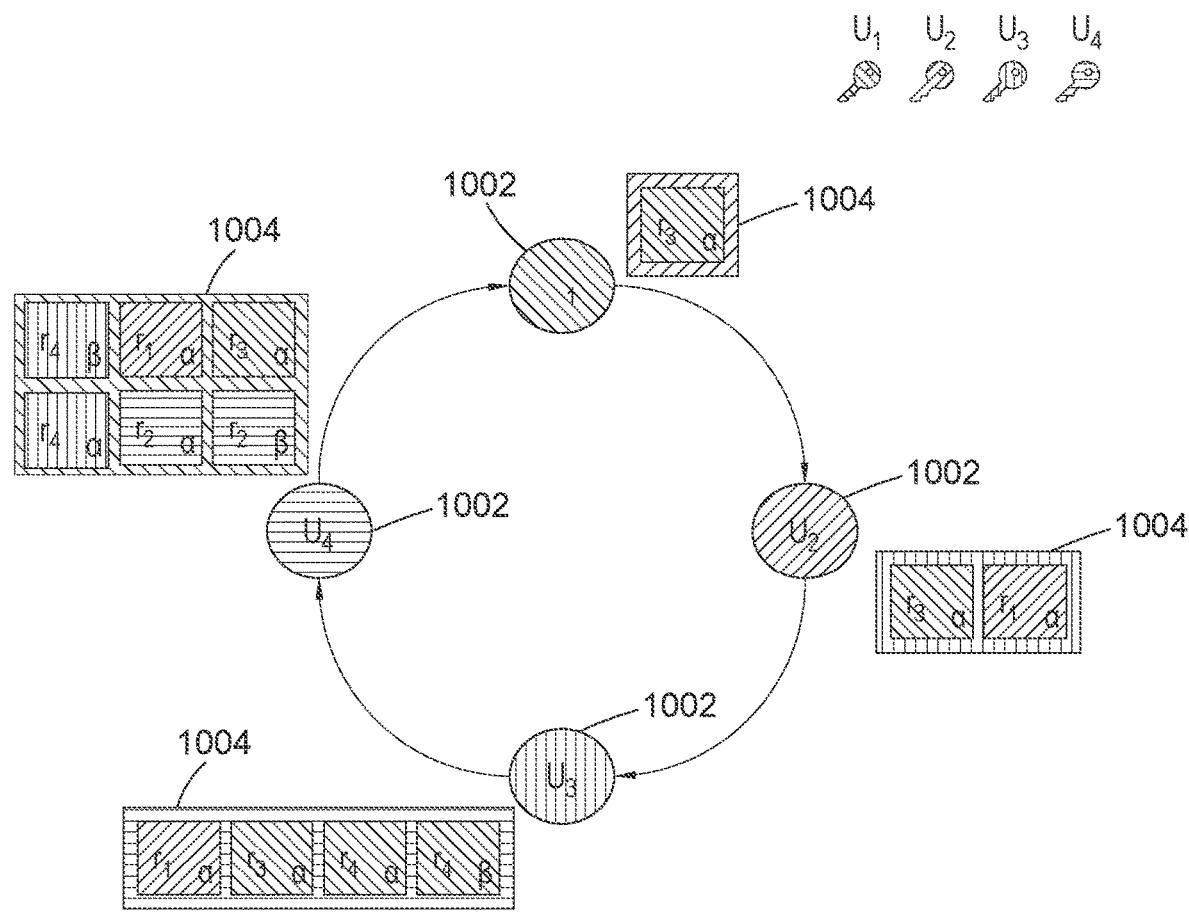
FIG. 10 illustrates an encryption phase of propagator node outputs based on an example coin mixing methods, in accordance with the present application.
Figure 11:
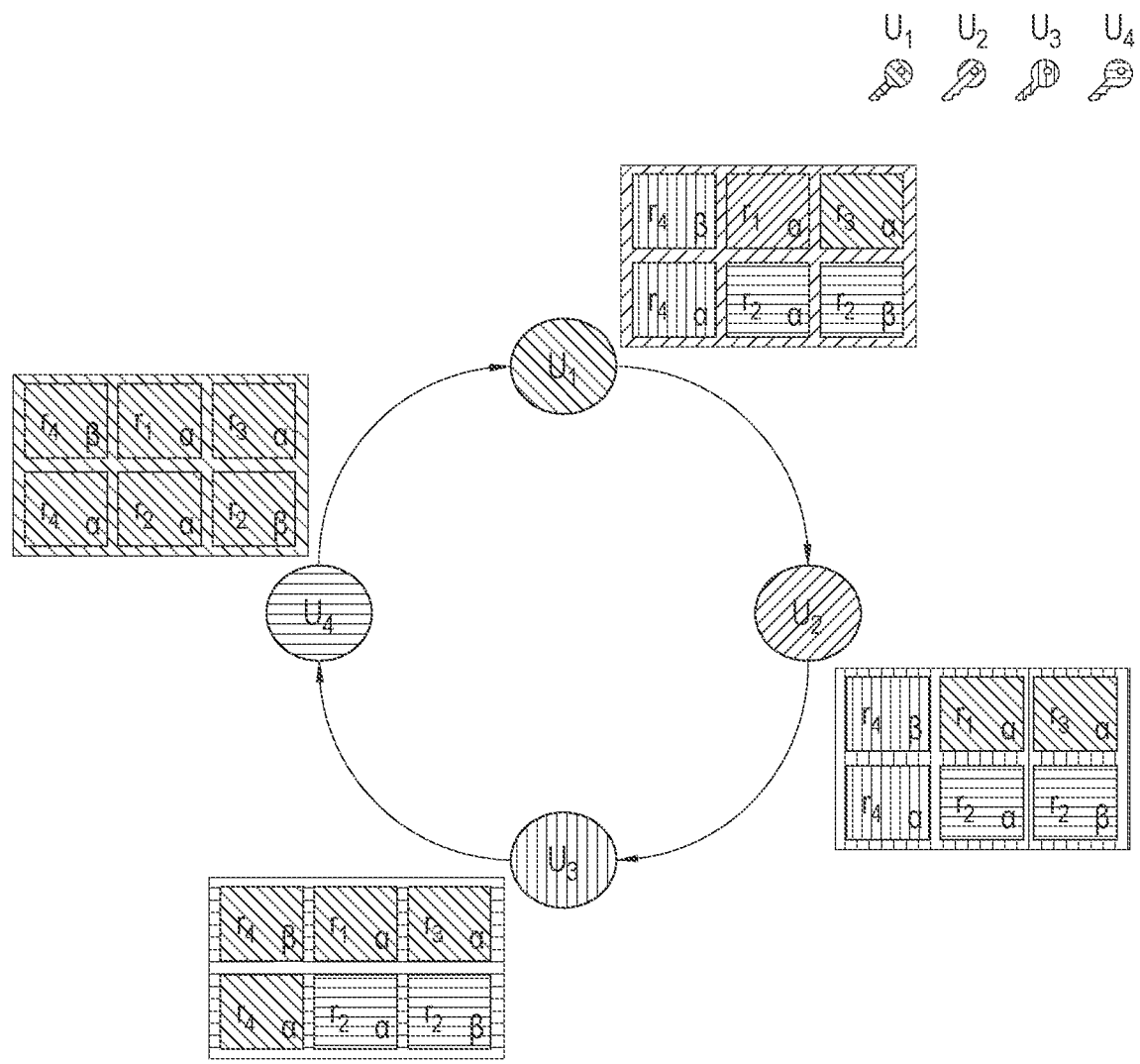
FIG. 11 illustrates a decryption phase for the example coin mixing methods of FIG. 10, in accordance with the present application.

To illustrate operations for shuffling and merging propagator output values, reference is now made to FIGS. 10 and 11, which diagrammatically illustrates an example CircleShuffle operations for shuffling and merging propagator node outputs of participating nodes to a blockchain transaction, as described herein. The CircleShuffle operations may be one example of shuffling and merging output addresses; however, any other coin mixing methods or operations may be used in combination with the BOD operations described herein.

FIG. 10 illustrates an encryption phase for the CircleShuffle operations. FIG. 11 illustrates a decryption phase for the CircleShuffle operations. For ease of exposition, the example CircleShuffle operations described with reference to FIGS. 10 and 11 will presume a group of 4 participating nodes; however, to appreciate the advantages of the operations described herein, greater than 4 participating nodes may be desired.

The encryption phase for the CircleShuffle operations of FIG. 10 includes four participating nodes 1002. For ease of exposition, individual participating nodes may be identified as "U1," "U2," "U3," and "U4." In particular, node U1 may be the designated propagator of node U3's transaction, where the token value may not be split. Node U2 may be the designated propagator of node U1's transaction, where the token value may not be split. Node U3 may be the designated propagator of node U4's transaction, where the token value may be split. Node U4 may be the designated propagator of node U2's transaction, where the token value may be split. As an illustrative example, an input value may be 10 Bitcoins, and when a participating node selects to split the input value, two 5 Bitcoin values may each be associated with an output value. When the input value may be split, a selector 230 (FIG. 2) may have selected a message option for providing two one-line propagator outputs. That is, the two one-line propagator outputs may be two output addresses, where each output address may be associated with a transaction value (see e.g., second message (r2) 360 of FIG. 3).

In FIG. 10, each participating node 1002 may encrypt a set of shuffled options (SSO) 1004 with a public key of a next node. To illustrate, node U1 may encrypt the propagator output (e.g., r3α) of node U1 with the public key associated with node U1 and encrypt a set of shuffled options (e.g., containing the encrypted propagator output $r_{3\alpha}$) with a public key of node U2. In some implementations, the propagator output may be associated with a transaction value and an output address associated with the transaction value. Node U1 may encrypt the SSO with the public key of node U2, such that when the encrypted SSO is transmitted to node U2, node U2 may decrypt the SSO. That is, a node that may not have the private key associated with node U2 may not be able to decrypt that SSO.

When node U2 receives the encrypted SSO from node U1, node U2 may: (i) decrypt the received encrypted SSO; (ii) encrypt the propagator output of U2 using the public key of node U2; and (iii) shuffle the order of the encrypted propagator outputs contained in the SSO. Once the encrypted propagator outputs have been shuffled, the shuffled SSO may ben encrypted using the public key associated with node U3. Node U2 may forward the updated and encrypted SSO to the next node.

In some implementations, when conducting operations to shuffle the order of the encrypted addresses in the SSO, the participating nodes may utilize any suitable pseudorandom process. It may be appreciated that pseudorandom processes for shuffling addresses may inherently be produced by a definite mathematical procedure.

Node U3 may carry out similar operations upon receiving the encrypted shuffled SSO from node U2, and may similarly encrypt an updated shuffled SSO with a public key of node U4. Node U3 may forward the updated and encrypted SSO to the next node, node U4. Similarly, node U4 may carry out operations upon receiving the encrypted shuffled SSO from node U3, and may similarly encrypt an updated shuffled SSO with a public key of node U1. Node U4 may forward the updated and encrypted SSO to the next node, node U1.

Following the encryption/shuffle operations illustrated in FIG. 10, in FIG. 11, the node U1 receives a set of shuffled outputs. Node U1 may decrypt the received SSO using a private key of the node U1 and search for node U1's encrypted output address in the SSO. When the node U1 retrieves node U1 's encrypted propagator output, node U1 may decrypt the propagator output using node U1' s private key and, subsequently, re-encrypt the propagator output using the public key of node U1. Node U1 may encrypt the updated SSO with a public key associated with the next available participating node, node Ui. The next available participating node, node Ui may not necessarily be node U2, but can be another node among the participating nodes.

Thereafter, node Ui may carry out similar operations of decrypting a received encrypted and updated SSO, searching for the propagator output associated with node Ui, decrypting that propagator output using the private key associated with node Ui, and re-encrypting the address with the public key of node U1. The node Ui may encrypt the updated SSO with the public key of another participating node (e.g., participating node in the set {U1, U2, . . . , Un}.

Once each participating node has searched for and: (i) found its encrypted propagator output in the received SSO, replaced it with its corresponding decrypted value, and re-encrypts the output address with the public key of node U1, the final updated and encrypted SSO may be transmitted to node U1. In the example implementation, the final updated and encrypted SSO may include output addresses encrypted with the public key of node U1.

Once node U1 receives the final updated and encrypted SSO, node U1 may decrypt, using the private key associated with node U1, the SSO for providing output addresses. The permutation of the output addresses of the final SSO may correspond to the final ordering in which outputs are included in the targeted blockchain transaction.

In some implementations, node U1 may create a blockchain transaction having the output addresses from the final updated SSO. Input from node U1 input may be added to a blockchain transaction using a SIGHASH_ANYONECAN-PAY signature script, and any other participating nodes may iteratively add input to the transaction. Node U1 may transmit the transaction to a next participating node, and the next participating node may check that the node's corresponding output information is correct, add its own input, sign the transaction, and forward the transaction to a further next participating node. Similar operations are carried out at any number of remaining participating nodes, until a last node in the participating nodes signs the transaction and submits the transaction to the blockchain.

It may be appreciated that when generating a blockchain transaction for N participating nodes for transferring value having the same value (e.g., each of N participating node transferring 10 bitcoins associated with one or more output addresses), the monitoring node may observe input addresses and output addresses over time and attempt to correctly associate transfer of value to particular transaction addresses.

However, when generating a blockchain transactions using coin mixing operations in combination with the BOD operations described herein for N participating nodes, m participating nodes may select to transfer value to more than one output address. The probability of the monitoring node correctly associating an input address with corresponding correct combination of output addresses (or with a single output address) based on data mining and machine-learning operations may decrease as the number of propagator outputs increase. For example, where m participating nodes may select to transfer tokens via a blockchain transaction to more than one output address, N−m participants may transfer value to a single output address, while m participants may split value into k amounts. Accordingly, the number of output addresses included in the coin mixing transaction may be:

$$N_{out}=(N-m)+km$$

$$N_{out}=N+(k-1)m$$

Further, the probability of the monitoring node correctly associating an input address with one output address may be:

$$p = \frac{1}{N_{out}} < \frac{1}{N}, k > 1, m > 1$$

In some implementations, additional cases may be considered when determining the probability of a monitoring node correctly associating an input address with output addresses:

When the split of transferred value may be even, the k output amounts may be equal. For example, k output amounts may be equal when the value is equally split (50/50).

When the split of transferred value is odd, the output amounts of the value being transferred may not be equal (e.g., 75/25, 80/20, etc.).

When the transfer of value may be evenly split, the number of possible combinations between m participants splitting value being transferred into k amounts may be provided by:

$$nC = \binom{km}{k} = \frac{km!}{k!\,(km-k)!}$$

When the transfer of value may not be evenly split, the number of possible combinations between m participants splitting their value being transferred into k amounts may be provided by:

$$nC = \frac{km}{2}\binom{km/2}{1} = \left(\frac{km}{2}\right)^2$$

In some implementations, the probability that a monitoring node may correctly associate one or more output address to a participating device may be provided as follows When the value transferred associated to an output address may be equal to an input (maximal) amount, the probability may be provided by:

$$P_a = \frac{1}{N-m}$$

When the value transferred associated to an output address may be less than the input (or maximal) amount, the probability of associating that output with an input address may be provided by:

$$P_1 = \frac{1}{km}$$

When the value transferred associated to an output address may be less than the input (or maximal) amount, the probability of associating several output addresses such that the sum of the value transferred equal the input (maximal) amount may be provided by:

$$P_k = \frac{1}{nC}$$

Accordingly, in some implementations, the probability for a monitoring node correctly associating a single output address to a single input address may be provided by:

$$p = \frac{1}{\frac{1}{P_a} + \frac{1}{P_1}} = \frac{1}{N+(k-1)m}$$

Further, the probability for a monitoring node correctly associating one or more output addresses to a single input address, thereby associating a full transferred value of a participating node, may be provided by:

$$p = \frac{1}{\frac{1}{P_a} + \frac{1}{P_k}} = \frac{1}{N-m+nC}$$

Accordingly, when the BOD operations described herein are carried out, the number of combinations of output addresses for transferring tokens may be greater than when the coin mixing methods may be carried out on their own. That is, when the BOD operations described herein are carried out, the probability that a monitoring node may correctly associate one or more output addresses to an input address may be less than when coin mixing methods may be carried out on their own. Accordingly, the methods described herein are directed to distributing, in a less deterministic way, token values to increase the overall entropy of the system and decrease the probability of associating an input address with an output address.

To illustrate, consider 10 participating nodes and two scenarios: (a) where an even split of value may be transferred; and (b) where an odd split (e.g., non-even split) of value may be transferred. If propagator output for 5 of the participating nodes result in splitting token value to two (e.g., k=2) output addresses (e.g., splitting 10 Bitcoin to two 5 Bitcoin output addresses) and if propagator output for the remaining 5 participating nodes do not result in any splitting of token values, the number of combinations, where N=10, m=5, k=2, may be provided as follows:

(a) Where an even split of value may be transferred:

$$nC = 5 + \binom{10}{2} = 5 + \frac{10!}{2!(8)!} = 50$$

(b) Where an odd split of value may be transferred:

$$nC = 5 + 5\binom{5}{1} = 30$$

In both examples, the number of combinations may be greater as compared to when the transaction options are not used. The probability that a monitoring node correctly associating one or more output addresses to an input address may be less as compared to operations of known coin mixing methods carried out on their own.

Figure 12:
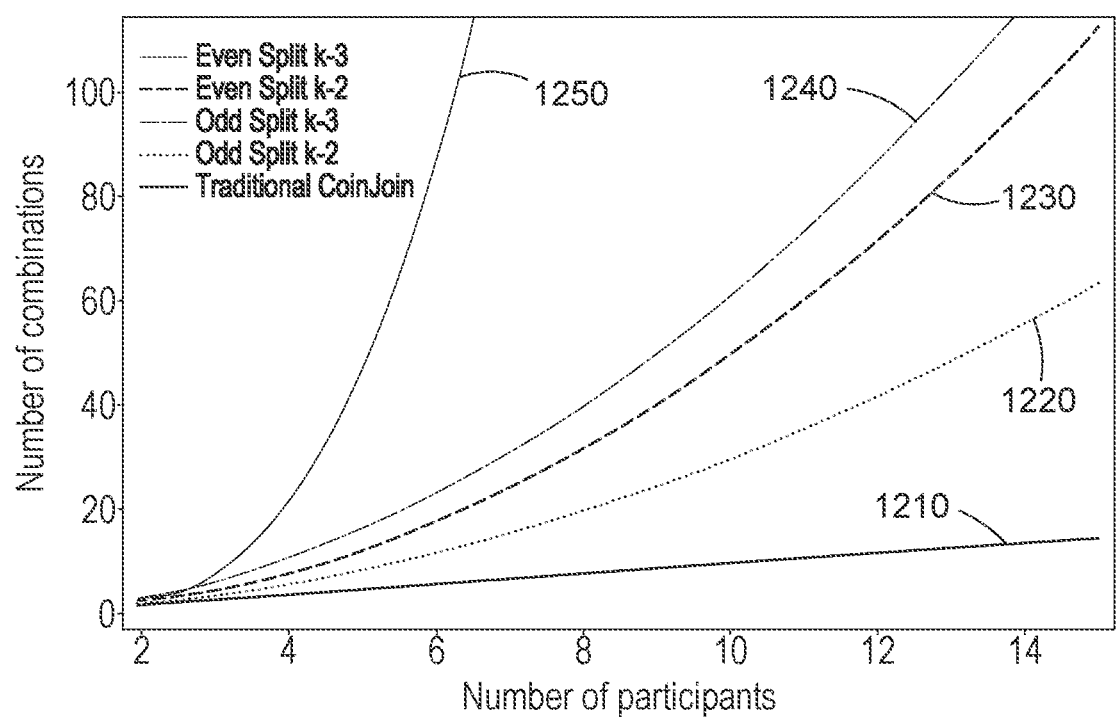
FIG. 12 illustrates distributions of number of combination of output addresses as a function of a number of participating nodes following operations of the methods described herein, in accordance with the present application.

Reference is now made to FIG. 12, which illustrates in graphical form the number of possible combinations of output addresses as a function of the number of participants for various values of k and for even or odd splitting, when m=N/2. It may be appreciated that the larger the number of combinations, the smaller the probability that a monitoring node may correctly make associations. That is, in some implementations, the probability of correctly associating one or more output addresses to an input address may be provided as an inverse of the distributions illustrated in FIG. 12. It may be appreciated that although the odd split cases may result in less possible combinations than even split cases, each of the cases may provide more combinations than those provided when carrying out operations of known coin mixing systems on their own.

In FIG. 12, the first curve 1210 illustrates the number the number of possible combinations of output addresses as a function of the number of participants whilst carrying out operations of known coin mixing methods. The second curve 1220 illustrates the number of possible combinations of output addresses when an odd split of value transferred is implemented, and when the value transferred may be split into two amounts (e.g., k=2). The third curve 1230 illustrates the number of possible combinations of output addresses when an odd split of value transferred is implemented, and when the value transferred may be split into three amounts (e.g., k=3).

Further, the fourth curve 1240 illustrates the number of possible combinations of output addresses when an even split of value transferred is implemented, and when the value transferred may be split into two amounts (e.g., k=2). The fifth curve 1250 illustrates the number of possible combinations of output addresses when an even split of value transferred is implemented, and when the value transferred may be split into three amounts (e.g., k=3).

The operations of the Blinded Outcome Diversification (BOD) methods described herein may ameliorate some disadvantages or security risks associated with distributing token value on a public ledger. The operations described herein do not rely on any centralized entity. In particular, operations described herein are carried out by participating nodes for cycles $C_i$, and propagator outputs are provided for each cycle. By randomly designating a participating node as selector for each cycle $C_i$, the operations of the BOD methods may increase the entropy of the system and more randomly distribute any node-specific biases, thereby decreasing the probability that the monitoring node may utilize machine-learning operations for deducing patterns across multiple transactions that reveal an association between input addresses and output addresses. It may be appreciated that, in some implementations, the operations of the BOD methods may require that the format of the possible message options and the token split values may need to be designated prior to commencement of operations for the N cycles among participating nodes to a blockchain transaction.

In some implementations, a monitoring node could be a participating node in a cycle according to the methods and computing devices described herein. For example, the monitoring node could be a participating node for a blockchain transaction, carrying out operations according to the methods described herein, or simply observing messages or ciphertext transmitted from participating node to participating node. Further, a monitoring node could be a blockchain node, which may not be a participating node in the cycle $C_i$. However, before the propagator outputs may be added to a blockchain transaction for submission to the blockchain, each of the participating nodes may sign the transaction to validate whether the outputs corresponding to their generated messages are correct. Accordingly, unless each participating node in the plurality of participating nodes signs the transaction, the transaction may not be validated for submission to the blockchain. The impact of a monitoring nodes carrying out operations or observing messages/ciphertext may be that the operations carried out according to each cycle may be wasted. In some implementations, to counteract participating devices acting as monitoring nodes, participating nodes may periodically alter their input addresses and output addresses.

Figure 13:
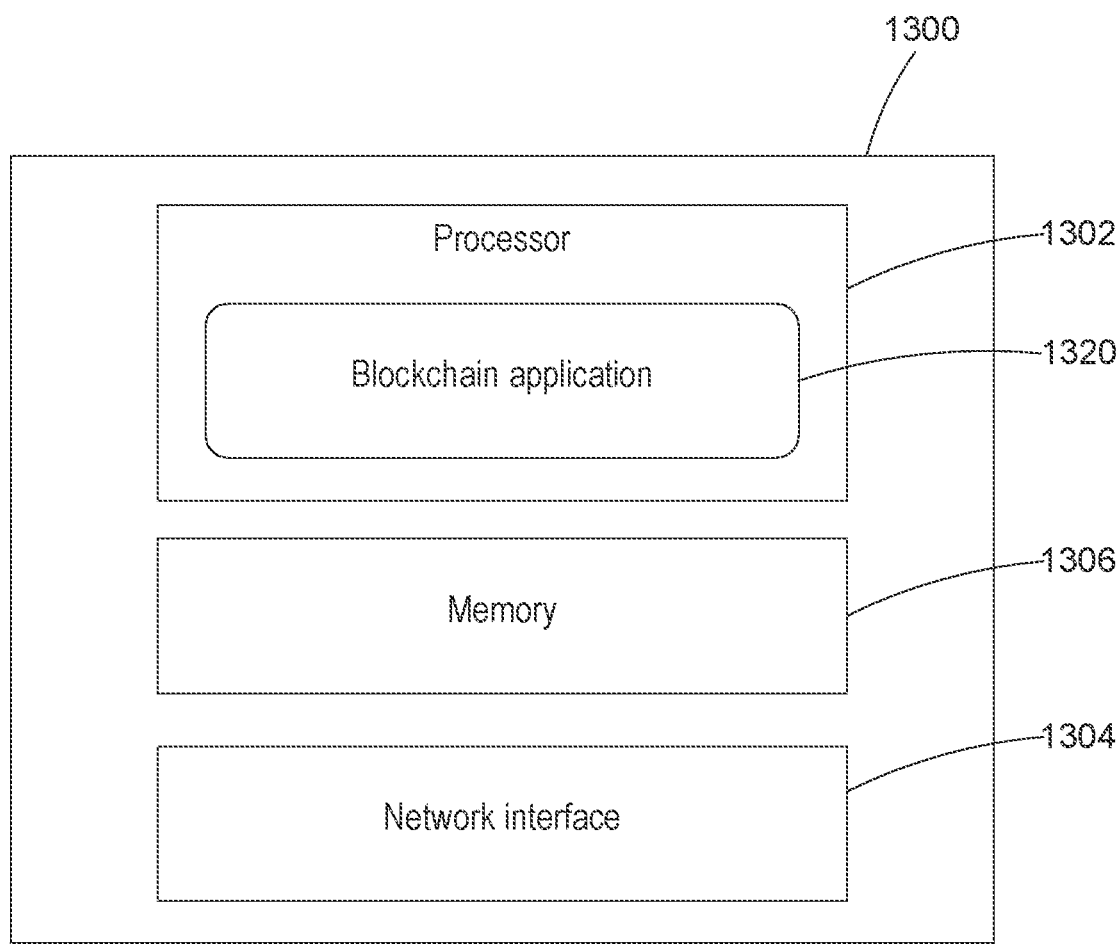
FIG. 13 illustrates, in block diagram form, a simplified example of a participating node, in accordance with the present application.

Reference is now made to FIG. 13, which illustrates in block diagram form a simplified example of a participating node 1300. The participating node 1300 may include a processor 1302, a network interface 1304 and a memory 1306. The participating node 1300 may be implemented using any suitable computing hardware having network connectivity and sufficient processing and memory resources to carry out the functions described herein. The participating node may include processor-executable instructions to implement the functions described herein. In some implementations, the processor-executable instructions may be referred to as a blockchain application 1320, although it will be appreciated that the instructions may be implemented in one or more modules, applications, scripts or other programming structures, depending on the hardware and the operating system. The processor 1302 may include a processor, a multi-core processor, and/or multiple processors. The memory 1306 may store data, including, in the example implementation, data of the operations described herein.

It will be understood that the devices and processes described herein and any module, routine, process, thread, application, or other software component implementing the described method/process for participating in a blockchain transaction may be realized using standard computer programming techniques and languages. The present application is not limited to particular processors, computer languages, computer programming conventions, data structures, or other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method to increase security of a blockchain-implemented transaction, in a network comprising a dealer node, and a plurality of participating nodes each having its own public key and private key, the method comprising:

for each of a plurality of cycles, obtaining a set of output addresses by:
at a dealer node, ordering said participating nodes such that there exists a cycle node order, designating a first node in the node order as a message originator, and the last node as a propagator, and designating one of the remaining participating nodes as a selector, wherein each node is not the message originator in more than one cycle node order, and each node is not the propagator in more than one cycle order, and designating one of said participating nodes as a selector node;
at the message originator, generating ciphertext comprising a nested encrypted first message and a nested encrypted second message, each message comprising one or more transaction details, and transmitting said ciphertext to a next participating node in said cycle node order, wherein:
each one of the transaction details comprises a transaction amount and an output address, and
for each cycle, the sum of the transaction amounts in the first message is equal to the sum of the transaction amounts in the second message;
transmitting said ciphertext from node to node in said cycle node order, each node decrypting the ciphertext before transmitting it, wherein the selector additionally removes one of the nested encrypted messages from the ciphertext before transmitting it; and
at the propagator, decrypting the remaining single message to obtain the one or more transaction details contained in the message;
at all the nodes designated as propagator, generating a shuffled order of the transaction details obtained from all the cycles; and
generating a blockchain transaction wherein each output of the transaction is based on one of the transaction details, and the outputs are ordered according to the shuffled order.

2. The computer-implemented method of claim 1, wherein said step of generating a shuffled order comprises:

at each of said propagators, encrypting each one of the transaction details obtained in its respective cycle using its public key, adding it to a shuffled set of encrypted transaction details, and shuffling the set.

3. The computer-implemented method of claim 2, further comprising the step of:
at each of said propagators except the last, encrypting the shuffled set with the public key of another propagator and transmitting the encrypted set to that propagator.

4. The computer-implemented method of claim 1, wherein for each cycle, said step of generating ciphertext at each message originator comprises:
generating the first message and the second message; and
successively encrypting each message using a transaction public key for the cycle and an ordered list of the public keys of the other participating nodes to generate two nested encrypted messages.

5. The computer-implemented method of claim 4, further comprising:
for each cycle, at said dealer node, providing said transaction public key for the cycle and said ordered list of node public keys to the message originator, wherein said ordered list is in the reverse order to the cycle node order.

6. The computer-implemented method of claim 5, further comprising:
for each cycle, at each said propagator node, generating a transaction public key for the cycle and a corresponding transaction private key for the cycle, and transmitting the transaction public key to said dealer node.

7. The computer-implemented method of claim 6, wherein for each cycle, said step of decrypting said nested message at said propagator comprises decrypting it with the private key of the propagator and then decrypting it with the transaction private key for the cycle.

8. A network of computing devices, each computing device being one of a plurality of participating nodes or a dealer node, each computing device comprising:
a network interface to provide network connectivity to at least one other participating node in the plurality of participating nodes;
a processor; and
a memory storing non-transitory computer-executable instructions that, if executed by the processor, cause the processor to:
for each of a plurality of cycles, obtain a set of output addresses by:
as a dealer node, order said participating nodes such that there exists a cycle node order, designate a first node in the node order as a message originator, and the last node as a propagator, and designate one of the remaining participating nodes as a selector, wherein each node is not the message originator in more than one cycle node order, and each node is not the propagator in more than one cycle order, and designate one of said participating nodes as a selector node;
as a message originator for the cycle, generate ciphertext comprising a nested encrypted first message and a nested encrypted second message, each message comprising one or more transaction details, and transmit said ciphertext to a next participating node in said cycle node order, wherein:
each one of the transaction details comprises a transaction amount and an output address; and
for each cycle, the sum of the transaction amounts in the first message is equal to the sum of the transaction amounts in the second message;
transmit said ciphertext from node to node in said cycle node order, decrypting the ciphertext before transmitting it, and as a selector additionally remove one of the nested encrypted messages from the ciphertext before transmitting it; and
as a propagator for a cycle, decrypt the remaining single message to obtain the one or more transaction details contained in the message;
as a propagator, generate a shuffled order of the transaction details obtained from all the cycles; and
as one of the propagators, generate a blockchain transaction wherein each output of the transaction is based on one of the transaction details, and the outputs are ordered according to the shuffled order.

* * * * *